United States Patent
Dean et al.

(10) Patent No.: US 9,488,478 B2
(45) Date of Patent: Nov. 8, 2016

(54) METHODS AND SYSTEMS FOR VISUAL FLIGHT RULE (VFR) CHART GENERATION

(75) Inventors: Christopher J. Dean, Castle Rock, CO (US); Todd Krawczyk, Highlands Ranch, CO (US)

(73) Assignee: The Boeing Company, Chicago, IL (US)

(*) Notice: Subject to any disclaimer, the term of this patent is extended or adjusted under 35 U.S.C. 154(b) by 1318 days.

(21) Appl. No.: 12/131,748

(22) Filed: Jun. 2, 2008

(65) Prior Publication Data

US 2009/0299619 A1 Dec. 3, 2009

(51) Int. Cl.
G01C 21/34 (2006.01)
G01C 21/00 (2006.01)
G08G 5/00 (2006.01)
G09B 29/00 (2006.01)

(52) U.S. Cl.
CPC ............... *G01C 21/00* (2013.01); *G08G 5/006* (2013.01); *G09B 29/006* (2013.01)

(58) Field of Classification Search
CPC ..... G01C 21/00; G08G 5/006; G09B 29/006
USPC .................... 701/3, 117, 120, 123, 200–203, 701/206–209; 340/995.1, 995.11, 995.19
See application file for complete search history.

(56) References Cited

U.S. PATENT DOCUMENTS

| | | | |
|---|---|---|---|
| 4,801,157 A * | 1/1989 | Sink | 283/35 |
| 5,610,815 A | 3/1997 | Gudat et al. | |
| 6,240,341 B1 * | 5/2001 | Snyder | 701/3 |
| 6,266,610 B1 | 7/2001 | Schultz et al. | |
| 6,600,991 B1 | 7/2003 | Jardin | |
| 7,039,505 B1 * | 5/2006 | Southard et al. | 701/3 |
| 7,324,895 B2 | 1/2008 | Nagel | |
| 7,363,152 B2 | 4/2008 | Sjanic | |
| 7,640,098 B2 * | 12/2009 | Stenbock et al. | 701/200 |
| 2004/0078262 A1 * | 4/2004 | Allard | 705/12 |
| 2006/0031006 A1 * | 2/2006 | Stenbock et al. | 701/200 |
| 2007/0043481 A1 * | 2/2007 | Metschan et al. | 701/3 |
| 2007/0112517 A1 * | 5/2007 | Goldstein | 701/301 |
| 2009/0228202 A1 * | 9/2009 | Wipplinger et al. | 701/206 |
| 2010/0090869 A1 * | 4/2010 | Wipplinger et al. | 340/977 |
| 2010/0217520 A1 * | 8/2010 | Stenbock et al. | 701/206 |

* cited by examiner

*Primary Examiner* — John Q Nguyen
*Assistant Examiner* — Anshul Sood
(74) *Attorney, Agent, or Firm* — Armstrong Teasdale LLP

(57) ABSTRACT

A method for generating one or more navigational charts for a geographic area is described. The method includes determining a frequency of travel between a plurality of destinations for the geographic area, the geographic area including a number of travel routes therein, defining one or more bounding boxes for placement within the geographic area, where the placement optimizes the number of travel routes within each bounding box, and generating one or more navigation charts for the area that have boundaries based on the bounding box definitions.

20 Claims, 7 Drawing Sheets

METHODS AND SYSTEMS FOR VISUAL FLIGHT RULE (VFR) CHART GENERATION

BACKGROUND OF THE INVENTION

The field of the invention relates generally to air vehicle navigation, and more specifically, to methods and systems for visual flight rule (VFR) chart generation.

There are some currently offered solutions for VFR charting in the U.S. market. However, these solutions have some drawbacks. For example, at least one VFR charting solution is built around latitude/longitude grids and gives no consideration to popular flight routes.

Customers that utilize the above mentioned VFR charting solution often complain that several charts are required to fly even short flights. This is due to the boundaries for those charts being based solely on latitude and longitude. It is believed that pilots would prefer a VFR chart solution that is built around popular VFR flight routes. With such a VFR flight route charting configuration, pilots are more likely to stay on one chart for a longer portion of their flight. The longer a pilot can remain on a single chart, the easier the flight planning and the easier the workload within the flight deck.

BRIEF DESCRIPTION OF THE INVENTION

In one aspect, a method for generating one or more navigational charts for a geographic area is provided. The method includes determining a frequency of travel between a plurality of destinations for the geographic area, the geographic area including a number of travel routes therein, defining one or more bounding boxes for placement within the geographic area, where the placement optimizes the number of travel routes within each bounding box, and generating one or more navigation charts for the area that have boundaries based on the bounding box definitions.

In another aspect, a visual flight rule (VFR) chart that is oriented over a geographic area is provided. The orientation of the VFR chart is based on the VFR travel routes utilized in the geographic area, and a boundary associated with the VFR chart is based on an optimization of the number of travel routes within the VFR chart.

In one aspect, a method for generating a navigational chart for a geographic area is provided. The method includes plotting frequently used travel routes for the geographic area based on historical flight plan data over a period, defining a bounding box for the geographic area whose orientation, size, and location optimizes the number of plotted travel routes therein, and generating the navigation chart to correspond with the bounding box.

DETAILED DESCRIPTION OF THE INVENTION

The described embodiments illustrate coverage areas and orientations for visual flight rules (VFR) charts based on historically popular VFR flight routes. While described herein in terms of VFR charts, it is to be understood that at least some of the described embodiments may be applicable to instrument flight rule (IFR) charts as well.

By providing VFR charting for geographic areas that are relevant to VFR flying in a particular area of the country, that is, oriented along actually used VFR flight paths, workloads for flight planning and actual flying of the aircraft are reduced. In a specific embodiment, filed flight plan information for a selected time period is used to design relevant coverage areas for VFR aeronautical charts, based on popular VFR flying routes. Such coverage areas, which are based on actual flight routes, rather than on geographic boundaries, allow most pilots to purchase fewer aeronautical charts because one chart is more likely to follow their flight path over a greater distance.

Figure 1:
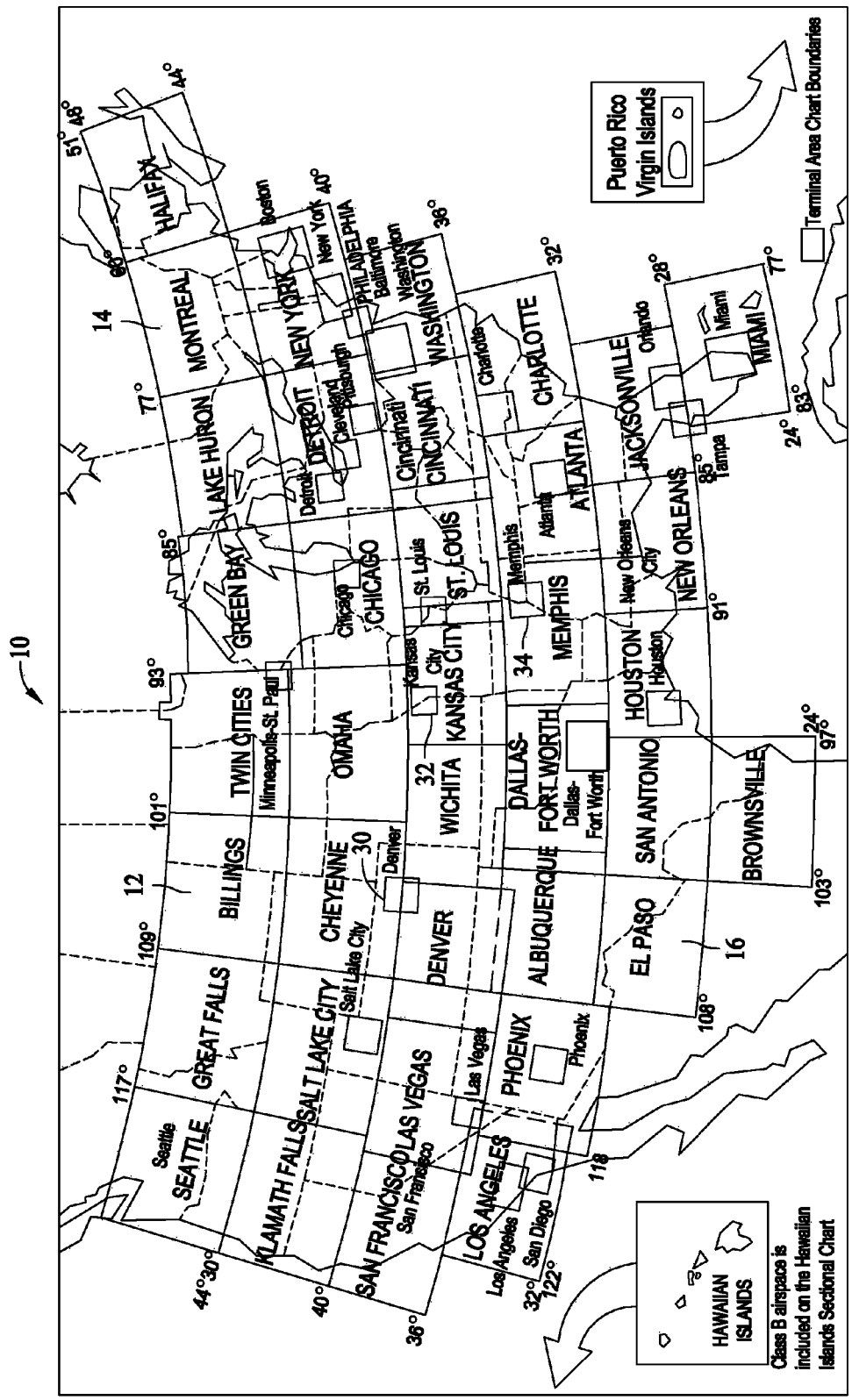
FIG. 1 is a map that is overlaid with geographical areas that are defined by latitude and longitude.

Customers that use VFR charts that are bounded geographically often complain that several charts are required to fly even short flights, since these charts are bounded based on latitude and longitude. An example of geographic bounding for preparation of such VFR charts is shown in FIG. 1, which is a map 10 overlaid with a plurality of geographic areas of which areas 12, 14, and 16 are a couple of example. These geographic areas are bounded by latitude lines and longitude lines as shown. These lat/long bounded geographic areas have traditionally been referred to as sectionals or tiles. As seen in the figure, each of these tiles is referred to by a city or region that is contained therein. For example, the geographic area 16 may be referred to as the El Paso tile or the El Paso sectional.

The geographic areas shown in FIG. 1 are those that have been defined by the agency that builds the currently utilized VFR charts for low flying aircraft throughout the country. This agency has been the only source for United States VFR charting for about the last 50 years. At that time, technology was such that it was easiest to divide, for example, the United States and surrounding areas along latitude and longitude lines, and then build up the VFR charts with the tools available at that time. One result is that the geographic areas covered by each VFR chart have not changed since then, and therefore are not related to actually used VFR flight routes.

In addition to the illustrated geographic areas, map 10 also illustrates several areas covered by terminal area charts (TACs), for example, areas 30, 32, and 34, are representative of Denver, Kansas City, and Memphis respectively. TACs are indicative of Class B air space (in layman's terms, a really busy airport). Charts similar to the VFR charts are available for the TACs. Referring still to FIG. 1, it can be seen that TAC area 30 overlaps the boundaries of three of the geographic areas defined by latitude and longitude.

One of the drawbacks of the geographic area/TAC system of FIG. 1, it that it can be inconvenient for pilots. For example, many VFR pilots in the Denver area fly north and south along the front range of the Rocky mountains, rather than going over the mountains, because of an increased risk to small aircraft due to, for example, more turbulent weather. However, due to the placement of the geographic areas based on latitude and longitude, a pilot utilizing VFR may have to switch back and forth between two or three different VFR charts, since his or her flight may take them to two or three of the geographic areas defined in FIG. 1.

Figure 2:
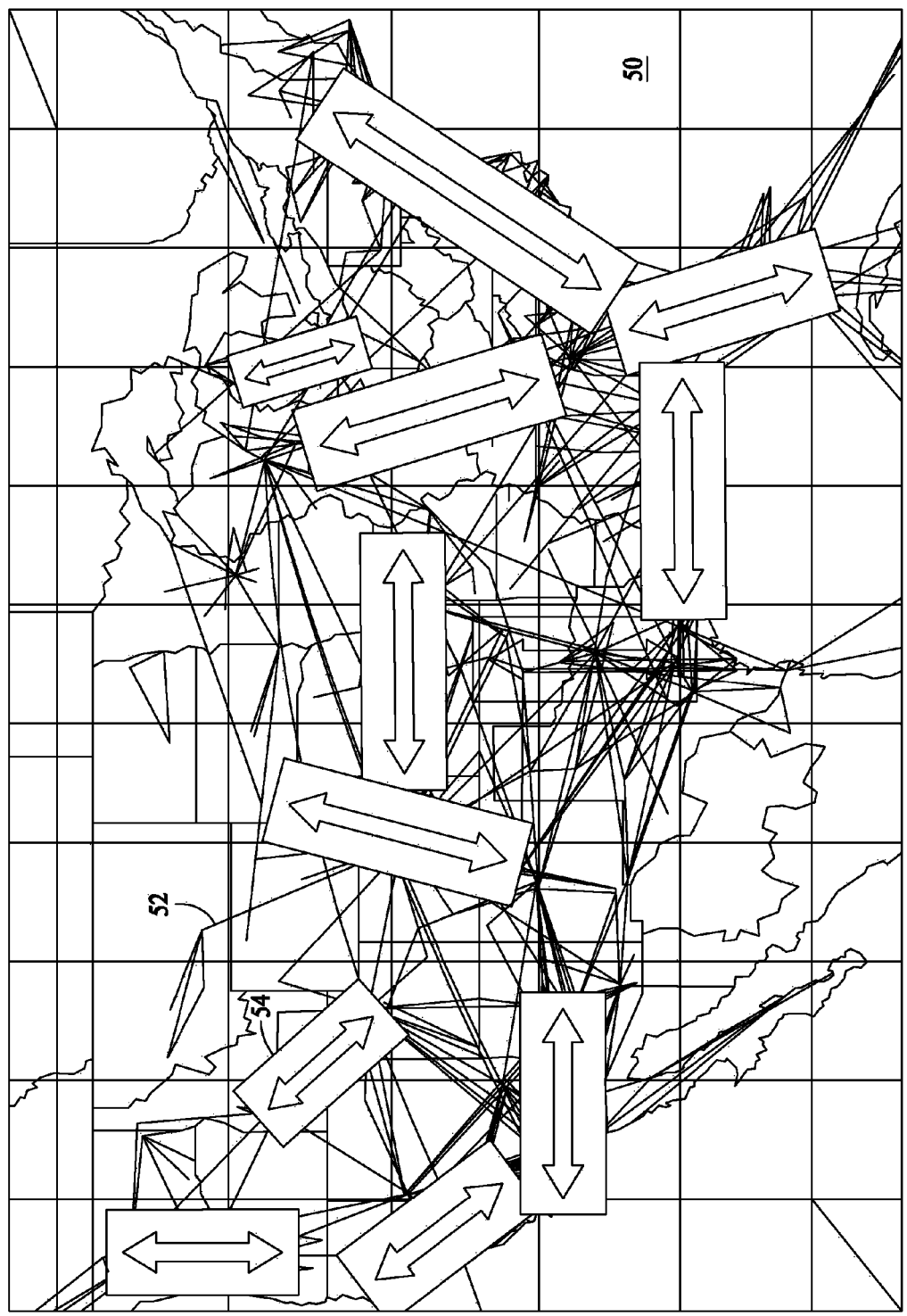
FIG. 2 is a map illustrating plots of popular VFR flight routes for most of the United States, with areas having dense flight routing encircled by boundaries.

FIG. 2 is a map 50 illustrating popular VFR flight routes for most of the United States, of which flight route 52 is but one example. VFR flight routes that are more densely packed, have been enclosed within the several boundaries 54 shown on map 50. To create such a map 50, starting points and ending points were taken from several flight planning products, over a period of time. Two of these products include real-time flight planner (RTFP) and Jeppesen Internet flight planner (JIFP). These start and end points are then plotted on the map 50 of the U.S. As a result, map 50 includes the historically (for example, over a calendar year) popular, and actual, VFR flight routes.

Figure 3:
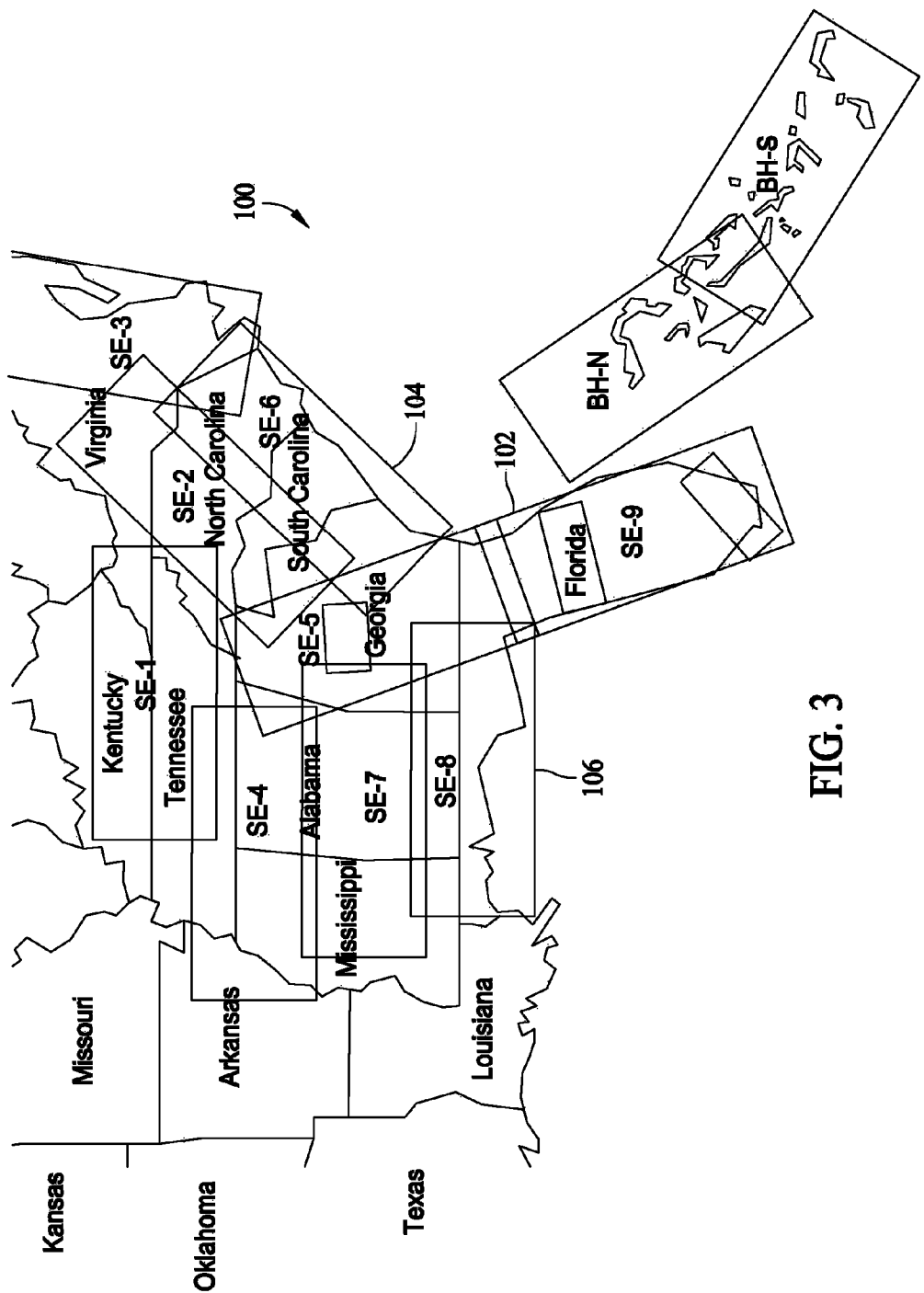
FIG. 3 is a map of the southeastern United States which includes bounding boxes for VFR charts overlaid thereupon, the bounding boxes oriented to substantially align with historical flight plan information.

FIG. 3 is a diagram 100 of the southeastern United States which includes eleven bounding boxes, of which bounding boxes 102, 104, and 106 are a couple of examples. In one embodiment, VFR charts oriented to the bounding boxes are provided. More specifically, the eleven VFR chart bounding boxes are built around popular VFR flight routes, each one optimizing the number of travel routes contained within the bounding box. Such a configuration is believed to provide an advantage over VFR chart coverage areas that are solely based on latitude and longitude, because it is believed that pilots are more likely to stay on a single VFR chart for an entire flight, or at least for a longer portion of their planned flight. Charts oriented to historical VFR flight routes also result in easier flight planning and reduced workload in the cockpit.

In one embodiment, a computer algorithm is utilized that receives the historical flight plan data, and uses that data to determine optimized sizes, locations and orientations for the bounding boxes. Alternatively, a computer algorithm receives the historical flight plan data and plots these travel routes on a map, at which point the bounding boxes may be sized, located and oriented manually for the production of the VFR charts.

To summarize, a map of popular VFR flight routes as shown in FIG. 2, is generated based on historical VFR flight plans. Upon review of the popular VFR flight routes, chart coverage (i.e., size location, and orientation) is determined based on a best fit, that is, where VFR pilots are actually flying, as shown in FIG. 3. VFR chart coverage and orientation that is relevant to popular VFR flight routes require the pilot to spend less time flight planning because they are more likely to need fewer VFR charts to cover the distance of their journey. In addition, any folds on a paper VFR chart are more likely to be perpendicular to the route of the flight since the chart is oriented to flight routes. This makes it easier for pilots to manage such a large paper chart in the cockpit as the VFR chart will "accordion" along the flight route. In one practical example, only one or two panels of a VFR chart folded into eleven panels are required at any one time during a flight.

As can be ascertained from FIG. 3, by providing VFR charts that are based upon actual flight plans, the orientations for the areas covered by the charts are necessarily different. As also shown in FIG. 3, these areas are also allowed to overlap, which in certain cases will also a user to purchase only one VFR chart instead of two or more. A size for the VFR chart geographical boundary (e.g., such as areas 102, 104, and 106) can also be adjusted.

The embodiments disclose and describe utilization of actual flight plan data, and a density of the flight plan data, as a basis for determining and developing boundaries and orientations for the production of VFR charts. The VFR charts described with respect to FIG. 1 were developed by basically laying out maps based on latitude and longitude, with no overlap between the areas. By allowing differing size and orientation for VFR charts, as well as overlap of VFR chart boundaries, users are able to reduce the number of different VFR charts that a pilot may have to purchase and use. Fewer VFR charts reduces work load for a pilot flying and planning VFR routes.

Figure 4:
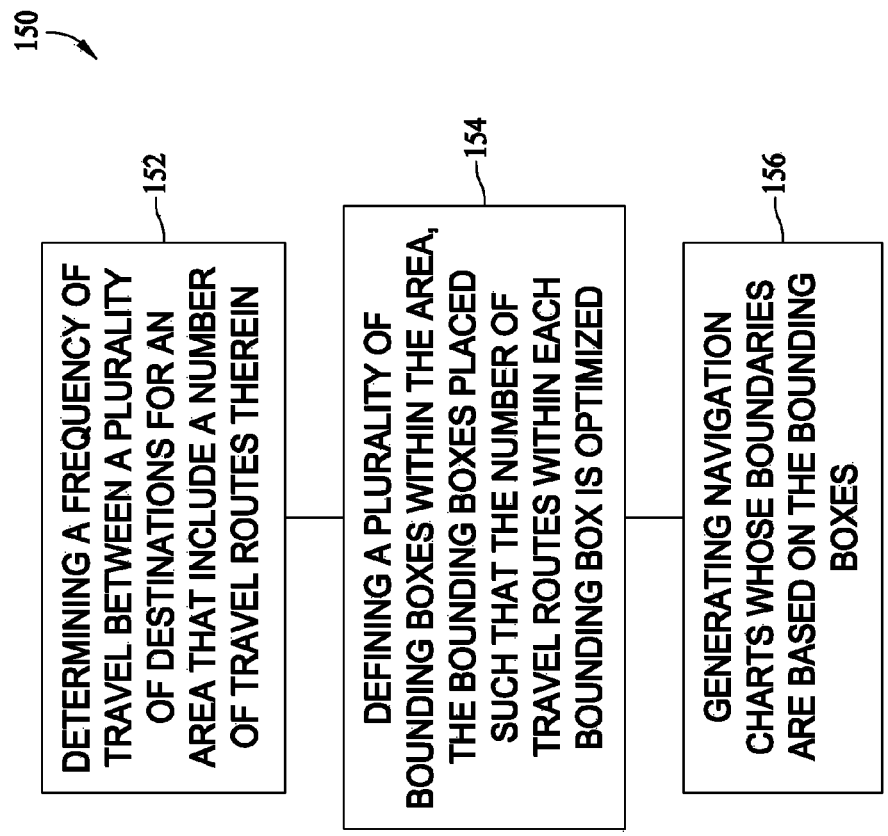
FIG. 4 is a flowchart illustrating a method for generating navigational charts based on historical flight plan information.

FIG. 4 is a flowchart 150 that illustrates the above described method for development of VFR and/or IFR charts for navigation, specifically, a method for determining aviation chart boundaries (VFR or IFR) and and their orientation based on typical routes of flight. Referring to flowchart 150, the method includes determining 152 the actual travel routes, and a frequency for these travel routes, between a plurality of destinations for an area that includes a number of the travel routes therein. A plurality of bounding boxes are defined 154 for the area and oriented such that the number of travel routes within each bounding box is optimized. Navigation charts are then generated 156 that have boundaries based on the bounding box boundaries. Generally, historical filed flight plans are used to determine appropriate boundaries and map extents for these navigation charts. One result is a set of sometimes overlapping VFR charts that are in multiple orientations to better serve commonly used sets of flight plans.

Figure 5:
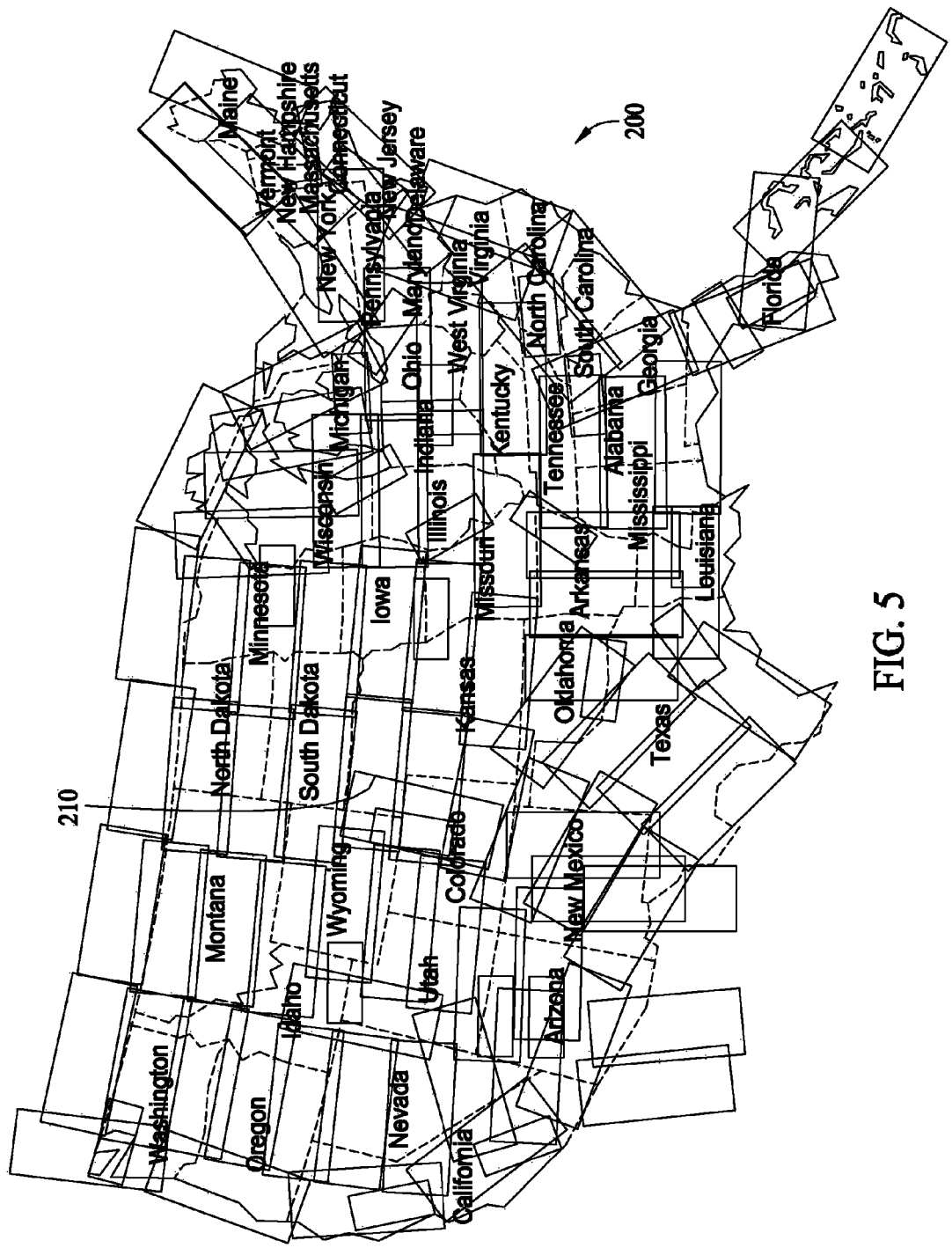
FIG. 5 is a map of the continental United States which includes one example of bounding boxes defining geographic areas for which VFR charts may be considered.

FIG. 5 is a map 200 of the continental United States which includes one example of bounding boxes defining geographic areas for which VFR charts may be considered. Map 200 helps to further illustrate the problems solved by the described embodiments. Specifically referring to the Colorado area, several east-west oriented bounding boxes are defined for which VFR charts could be generated, as well as a north-south oriented bounding box 210 for which a VFR chart could be generated. With such availability, pilots are able to select which VFR charts to purchase based on their preferred flying orientation and destination. This is an improvement over the prior art, which essentially presents a set of latitude-longitude defined areas that do not overlap. Therefore the described embodiments provide an entirely different way of approaching flight planning and VFR chart generation, one that is real world oriented and based on historically traveled VFR routes, and not based on historically defined geographic areas that based solely on a map defined position.

Figure 6:
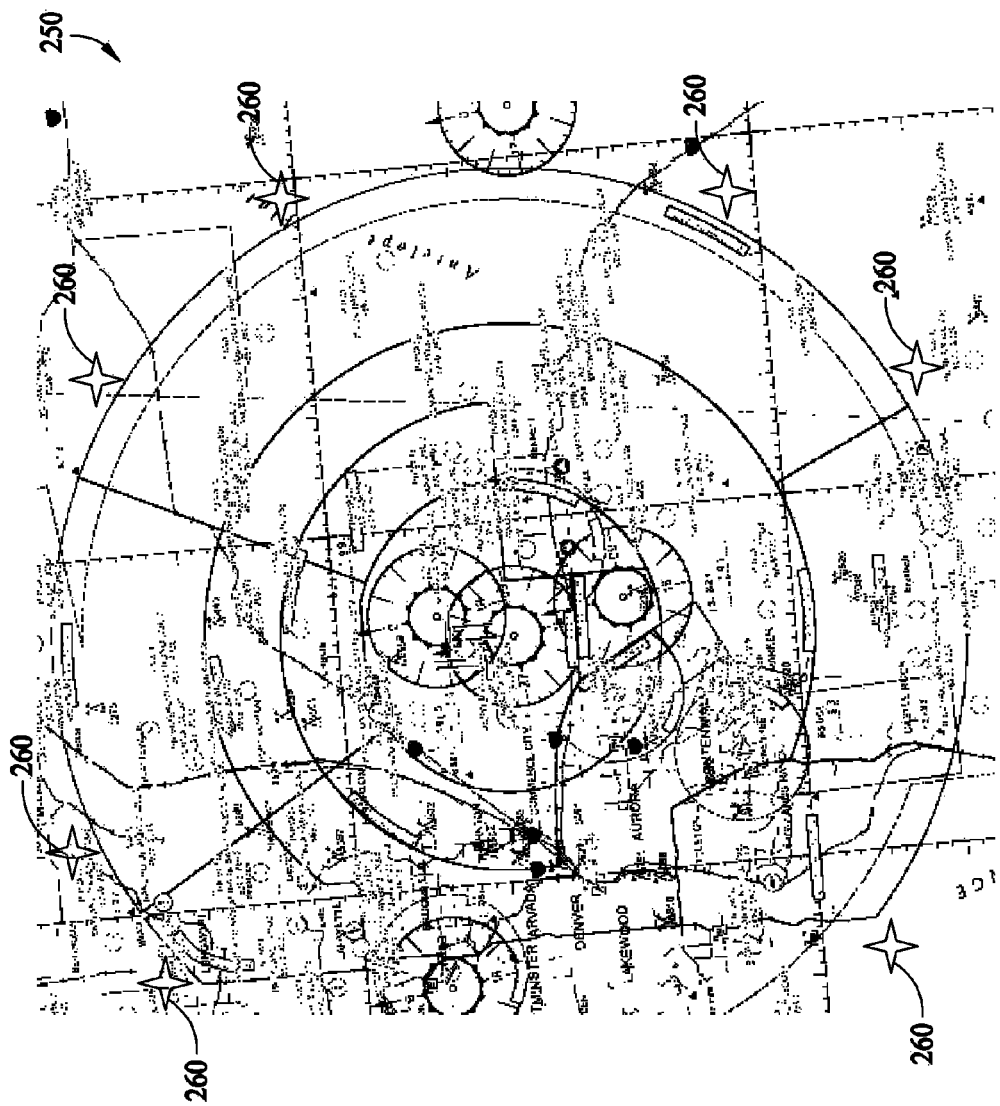
FIG. 6 is a portion of a VFR chart generated using the method of FIG. 4 that includes several waypoints defined by their GPS position.
Figure 7:
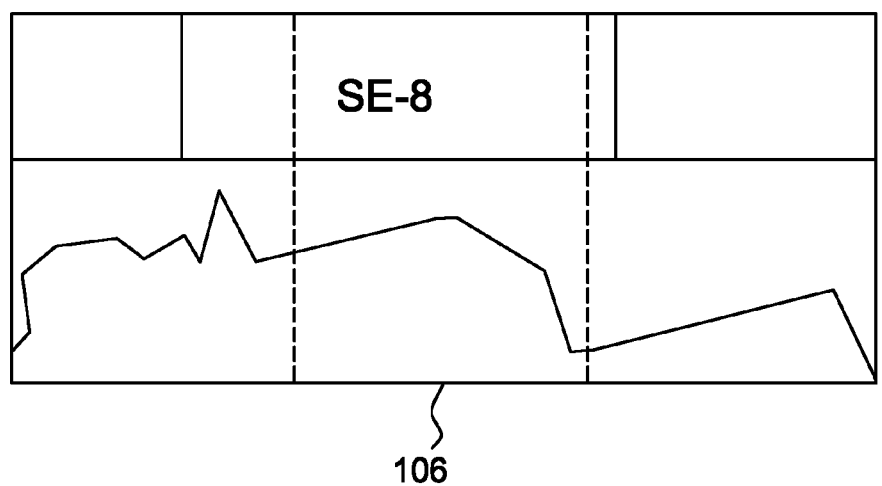
FIG. 7 is a visual flight rule (VFR) chart formed from a bounding box shown in FIG. 3, and having pre-made fold lines defined therein.

The VFR charting method based on latitude and longitude defined geographic areas, as described with respect to FIG. 1, were developed when pilots utilized methodologies such as dead reckoning and wing correction to get from point A to point B. However, the VFR charting method associated with FIGS. 3 and 4 goes hand in hand with navigation procedures that are currently being utilized, specifically, utilization of GPS. Specifically, the VFR charts described herein further incorporate symbols that are in line with the way pilots are navigating today, which is using GPS. FIG. 6 is a portion of a VFR chart 250 generated using the method of FIG. 4 that includes several waypoints 260 that have been defined based on their GPS position. Pilots are able to use the latitude and longitude for the waypoints 260, that is input the latitude and longitude of the waypoints into their GPS thereby linking their GPS to the paper VFR chart. This allows a pilot to navigate to a waypoint, on the paper VFR chart, via GPS. Currently, there is no VFR chart that allows a user to take a latitude and longitude from the VFR chart, which they then input into their GPS, thereby allowing the pilot to navigate to that point on that paper chart via their GPS.

In another embodiment, the paper VFR charts include user defined waypoints. By collecting the user generated waypoints when collecting the historical travel route data according to the methods disclosed herein, a library of "tribal knowledge" can be generated. When these user defined waypoints are included on a specific VFR chart 250, an eventual user of the chart will receive the benefit of the "tribal knowledge" which may include, for example, a series of waypoints for avoiding an obstacle such as a restricted air space, a busy airport, or a suggested navigation through a piece of terrain, such as an optimum route through a mountain pass. This methodology provides all users of the VFR chart 250 the benefit of the previous piloting experiences for the geographic area within the VFR chart 250. Waypoints that are based on tribal knowledge, rather than those that are defined by an agency can be collectively referred to as commonly used VFR/GPS waypoints or undocumented waypoints.

The advantage to such waypoints is that there is no reliance on a national standard body or other navigation data source. The described method for adding user defined waypoints is essentially a poll of the aviation community to determine where helpful waypoints should be, and therefore is a different way of generating a map and a portion of the map contents.

While user-defined waypoints are thought to be helpful for the flight planning, when a pilot manually enters a flight plan, they generally do not put in user defined GPS waypoints. However, there are several computer-based flight planning services that allow for drag and drop flight path planning. When flight planning with such a service, GPS waypoints are defined and filed as part of the flight plan (e.g., WP1, WP2, etc.). As some of these planning services are internet-based, these flight plans, and thus the GPS waypoints, are stored at a central computer or within a database. In one embodiment, these filed flight plans are parsed for the GPS waypoints therein. In one embodiment, where certain GPS waypoints (for example, GPS coordinate waypoints are within $^1/_{10}{}^{th}$ of one degree of latitude and longitude of one another) are repeated within multiple flight plans, these GPS waypoints may be utilized as user defined (or commonly used, but undocumented) waypoints. In one example, where four or more of these waypoints exist, their locations are averaged and a use frequency attribute is associated with that GPS waypoint.

In alternative embodiments, an on-line voting system is utilized to determine the best VFR chart orientations and/or coverage area (chart size). One practical example is for an area such as the northwestern U.S. where there may not be a clear chart orientation preference, due to a minimal number of filed flight plans. In addition, the on-line voting system is utilized to establish both GPS-based waypoints for commonly flown areas, for example, certain mountain passes, and waypoint identifiers for scenic fly-over points. In still another alternative, the on-line voting system is utilized to add map identifiers for pilot (user) defined chart identifiers, such as certain GPS coordinates.

In addition to the on-line voting system, algorithms for determining map orientation and size are included that also provide an ability to filter and/or validate the received on-line input. In one embodiment, these algorithms are based on scaling and paper size. In another embodiment, the algorithms are based on a typical distance, for example, 350 or 500 nautical miles.

In summary, the described embodiments, describe a method where historical flight plans are collected and analyzed. For example, and in one embodiment, starting and ending points for the flight plans are taken from products such as a Real Time Flight Planner (RTFP) and a Jeppesen Internet Flight Planner (JIFP). These starting and ending points are then plotted on a map, for example, a map of the U.S. A review of the plots reveals the popular VFR flight routes. An overlay of the map is then generated that includes bounding boxes that provide a best fit to the flight plans the VFR pilots are actually flying. In other words, the VFR charts that result are organized based on typical flight paths, based on historical flight plan filings. Portions of the bounding boxes may overlap, based on the historical flight plans. The resulting product includes one or more VFR charts that cover a flight route based on the starting point to the ending point. The charts are read in the direction of flight plan (oriented to the flight path), and is not based on latitude and longitude. The folds on the paper chart more likely to be perpendicular to the route of the flight, thereby making utilization of the VFR chart easier. In addition, such a chart will likely "accordion" fold along the flight route so only one or two panels of, for example, an eleven panel chart are required at any one time.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for generating one or more navigational charts for a geographic area, said method comprising:
   determining a frequency of travel between a plurality of destinations for the geographic area, the geographic area including a number of frequently traveled routes therein;
   defining one or more bounding boxes for placement within the geographic area, where the placement of the bounding boxes is at least partially based on the number of frequently traveled routes resulting within each bounding box after the placement; and
   generating one or more navigation charts for the area, the navigation charts including paper charts having boundaries based on the bounding box definitions, wherein the paper charts include one or more pre-made fold lines oriented substantially perpendicularly to the frequently traveled routes to facilitate optimizing a size of the paper charts.

2. A method according to claim 1 wherein defining one or more bounding boxes for placement within the geographic area further comprises overlapping a portion of a first defined bounding box with a portion of a second defined bounding box.

3. A method according to claim 2 wherein overlapping a portion of a first defined bounding box with a portion of a second defined bounding box comprises determining an overlap area based on a frequency of travel within the area considered for overlap.

4. A method according to claim 1 wherein generating one or more navigation charts comprises generating paper charts that correspond to one of the defined bounding boxes and fold accordion-style along the defined bounding box.

5. A method according to claim 1 wherein determining a frequency of travel between a plurality of destinations for the geographic area comprises using historical flight plan data to determine the frequently traveled routes.

6. A method according to claim 5 wherein defining one or more bounding boxes for the area comprises orienting the bounding boxes in various orientations based on the historical flight plan data.

7. A method according to claim 1 wherein determining a frequency of travel between a plurality of destinations for the geographic area comprises plotting starting points and ending points for multiple flight plans, the starting points and ending points received over a period of time via at least one computer-based flight planning product.

8. A method according to claim 1 wherein defining one or more bounding boxes for placement within the geographic area comprises adjusting one or more of a size, location, and orientation of the bounding boxes based upon the number of travel routes resulting within each bounding box.

9. A method according to claim 1 wherein defining one or more bounding boxes for placement within the geographic area comprises utilizing an on-line voting system to determine at least one of the best VFR chart orientation and chart size for a geographical area.

10. A method according to claim 1 wherein generating one or more navigation charts for the area comprises utilizing an on-line voting system to establish at least one of GPS-based waypoints for commonly flown areas, waypoint identifiers for scenic fly-over points, and add map identifiers for user defined chart identifiers.

11. A method according to claim 1 wherein generating one or more navigation charts for the area comprises:
    parsing previously filed flight plans for GPS waypoints;
    utilizing GPS waypoints that are substantially the same location in a number of filed flight plans as user defined waypoints in the navigation chart.

12. A visual flight rule (VFR) chart that is oriented over a geographic area, the orientation of said VFR chart based on frequently traveled VFR routes utilized in the geographic area, and a boundary associated with said VFR chart at least partially based on the number of the frequently traveled VFR routes that result within said VFR chart, wherein said VFR chart is a paper chart including one or more pre-made fold lines oriented substantially perpendicularly to the frequently traveled VFR routes to facilitate optimizing a size of the paper chart.

13. A VFR chart according to claim 12 wherein the boundary associated with said VFR chart overlaps a portion of a boundary associated with another said VFR chart, the overlap area based on a frequency of travel within the geographic area considered for overlap.

14. A VFR chart according to claim 12 wherein said VFR charts is configured to fold accordion-style along the boundary associated with said VFR chart.

15. A VFR chart according to claim 12 wherein the VFR travel routes utilized in the geographic area are based on flight plan data that has been filed over a period of time.

16. A VFR chart according to claim 12 wherein the VFR travel routes utilized in the geographic area are determined based on plots of starting points and ending points for multiple flight plans within the geographic area.

17. A VFR chart according to claim 12 wherein the orientation and boundary associated with said VFR chart is further based on results of an on-line vote related to at least one of a best VFR chart orientation and a preferred area covered by said VFR chart.

18. A VFR chart according to claim 12 further comprising at least one of GPS-based waypoints for commonly flown areas, waypoint identifiers for scenic fly-over points, and map identifiers for user defined chart identifiers.

19. A VFR Chart according to claim 18 where at least a portion of the at least one of GPS-based waypoints, waypoint identifiers, and map identifiers included in said VFR chart are based on results received from VFR chart users via an on-line voting system.

20. A method generating a navigational chart for a geographic area, said method comprising:
    plotting frequently used travel routes for the geographic area based on historical flight plan data over a period;
    defining a bounding box for the geographic area whose orientation, size, and location is at least partially based on the number of plotted frequently used travel routes therein; and
    generating the navigation chart to correspond with the bounding box, the navigation chart including a paper chart having one or more pre-made fold lines oriented substantially perpendicularly to the plotted frequently used travel routes to facilitate optimizing a size of the paper chart.

* * * * *